United States Patent [19]
Roberts et al.

[11] Patent Number: 4,803,101
[45] Date of Patent: Feb. 7, 1989

[54] MICROCRACK RESISTANT COMPOSITES

[75] Inventors: Beverly K. Roberts, Hockessin, Del.; George E. Zahr, Glen Mills, Pa.

[73] Assignee: E. I Du Pont De Nemours and Company, Wilmington, Del.

[21] Appl. No.: 67,116

[22] Filed: Jun. 29, 1987

[51] Int. Cl.[4] .............................................. B32B 3/12
[52] U.S. Cl. .................................... 428/116; 156/292; 427/381; 427/386; 427/412; 428/413; 428/414; 428/423.5; 428/474.4
[58] Field of Search ............ 428/116, 413, 414, 423.5, 428/474.4; 156/292; 427/381, 386, 412

Primary Examiner—Bernard Pianalto

[57] ABSTRACT

Microcrack resistant composites are prepared by precoating and prepregging woven fabrics of poly(phenylene terephthalamide) fiber at low warp tension.

4 Claims, No Drawings

MICROCRACK RESISTANT COMPOSITES

BACKGROUND OF THE INVENTION

Laminates of woven fabrics of poly(paraphenylene terephthalamide) fiber impregnated with epoxy resin are employed as facesheets over cores for certain aircraft applications. It has been found that transverse matrix microcracks are generated in the facesheets during thermal and moisture cycling. It is believed that the microcracks form because of stresses resulting from the mismatch of the laminate components in expansion and contraction during cycling. An object of the present invention is to reduce or to prevent formation of the microcracks while still maintaining acceptable mechanical properties.

SUMMARY OF THE INVENTION

The present invention provides a process for preparing epoxy resin impregnated woven fabrics of poly(paraphenylene terephthalamide) filaments which are resistant to microcracking when employed as a facesheet over a honeycomb core of poly(metaphenylene isophthalamide) and subjected to cycling between 160° F. and −65° F. which comprises the steps of:

(a) precoating a woven fabric of poly(phenylene terephthalamide) filaments with from 0.1 to 10% by wt. of a mixture of an epoxy resin and a urethane rubber soluble in the epoxy resin, said rubber being present in an amount of from 5 to 40% by wt. of the mixture, and said mixture having a strain to failure of at least 2.5% at −65° F.;

(b) heating the precoated fabric to an elevated temperature in the range of 250°–400° F. for a time sufficient to "B" stage the resin;

(c) impregnating the resulting precoated fabric with from 35 to 70% by wt. of an epoxy resin having a modulus in excess of 400,000 psi.; and (d) heating the impregnated product to an elevated temperature in the range of 250°–400° F. for a time sufficient to "B" stage the resin, each of steps (a) through (d) above being carried out at a warp tension of less than 0.4 lb/in. of warp width.

DETAILED DESCRIPTION OF THE INVENTION

In the performance of the present invention, one starts with a woven fabric of poly(paraphenylene terephthalamide) filaments. Commercially such fabrics are prepared from "Kevlar" aramid fiber (a product of E. I. du Pont de Nemours and Company). The fabric is precoated with a solution which provides good wetting particularly at the warp-fill cross-over points of the fabric. The solids of the solution must adhere well to the fabric and remain ductile throughout the range of service temperatures to be experienced by the end use application which for aircraft should extend from 160° F. to −65° F. In order to provide good wetting, the precoat solution typically should have a solids concentration no greater than about 10% by wt. and a viscosity of 10 centipoise or less. Epoxy resin or mixtures thereof which adhere well to the fabric typically have short beam shear strengths of 7.5 ksi or better when measured in a unidirectional composite with a fiber volume fraction of 0.6.

It is important that the precoat have good ductility at low temperatures as well as at room or elevated temperatures. Thus, the precoat mixture should have a strain-to-failure of at least 2.5% at −65° F. To achieve this, the epoxy resin or resin mixture is toughened with from 5 to 40% by wt. of a soluble urethane rubber. Typical useful resins are diglycidyl ethers of bisphenol A and aliphatic diols. Commercially available Epon 828, Epon 826 and Epon 871, products of the Shell Co., may be employed while "Adiprene L 100", a product of Uniroyal, is a useful urethane rubber soluble in the epoxy resin. Solubility is determined qualitatively by observation. If addition of the rubber does not materially affect clarity of the resin, then it is soluble in the resin. The epoxy-rubber mixture along with appropriate curing agents is dissolved in a solvent, such as methyl ethylketone (MEK) to provide a bath through which the fabric is passed. The fabric warp tension should not exceed 0.4 lb/in. of warp width as the fabric passes through the bath and the solids pick-up should be from 0.1 to 10% by wt. in the precoating step.

The wet precoated product is then passed through an oven in which the fabric is heated to an elevated temperature for a time sufficient to drive off solvent and to "B" stage the epoxy resin. Temperatures in the range of 250° to 400° F. for periods less than about 10 minutes are normally required to "B" stage the resin. Converting epoxy resin to the "B" stage is well understood in the composites art, see U.S. Pat. No. 4,590,539. Again, it is important that the precoated fabric be maintained relatively free of tension, below 0.4 lb/in. of warp width, as it passes through the oven.

The precoated fabric is then impregnated with from 45 to 70% by wt., based on the weight of the fabric of an epoxy resin having a modulus in excess of 400,000 psi along with approximate adjuvants. Application of this resin is conveniently made by passage through a solution havng an epoxy resin solids content of 55 to 60% by wt. at a warp tension no greater than 0.4 lb/in., of warp width. The solvent may be methyl ethylketone or an equivalent. The add-on, on a solvent free basis, should be from 35 to 70% by wt. of epoxy resin. Finally, the impregnated fabric is passed through an oven at 250° to 400° F., while at a tension no greater than 0.4 lb/in. of warp width. It is heated for a period of time sufficient to drive off the solvent and "B" stage the epoxy resin.

Test Procedures

Resin Modulus, Strain-to-Failure: ASTM D638, Test Method for Tensile Properties of Plastics.

Short Beam Shear Strength of Unidirectional Composites: ASTM D2344, Apparent Interlaminar Shear Strength of Parallel Fiber Composite by Short Beam Method.

Thermal Cycling - described in the Example below.

The following example is intended to illustrate the invention and is not intended as limiting.

EXAMPLE

Two types of prepreg were made using Style 285 fabric (1140 denier yarn, 17 ends per inch by 17 ends per inch, crowfoot satin weave) of poly(paraphenylene terephthalamide) fiber with an epoxy resin having a strain to failure of 4% at −65° F. Prepreg A was made by solution precoating the fabric with a 2% by wt. mixture in acetone of an epoxy resin and a urethane rubber soluble in the resin. The urethane rubber comprised 25.4% by weight of the solids in the mixture. The wet precoated (2% solids add-on) fabric was "B" staged at 220°–230° F. for 5 minutes. Both the precoating and "B" staging operations were performed with a warp tension of 0.3 pounds per inch of warp width. The precoated fabric was solution prepregged in a 57% by weight mixture of epoxy resins with modulus of 470,000 psi in a mixture of suitable solvents. The wet prepregged fabric was "B" staged at 270°–280° F. for 6.7 minutes. Both the prepregging and "B" staging operations were performed with a warp tension of 0.3 pounds per inch of warp width. Prepreg B was made by a similar process except that the fabric was not precoated prior to prepregging and the warp tension during prepregging and "B" staging was 0.73 pounds per inch of warp width.

The "B" staged prepregs were cut into 12 inch by 12 inch pieces and laid up as follows: (1) two pieces of prepreg were placed warp face up on mold release sheets on the metal tool sheet of a vacuum bag, (2) a 12 inch by 12 inch piece of ½ inch thick honeycomb core of poly(metaphenylene isophthalamide) ("Nomex", a product of E. I. du Pont de Nemours and Company), with a density of 3 pounds per cubic foot was placed on top of the prepreg sheet with the core ribbon direction perpendicular to the fabric warp direction, (3) two pieces of prepreg were placed on top of the honeycomb core with the fabric warp faces toward the core and the fabric warp direction perpendicular to the core ribbon direction. A steel caul plate covered with a mold release sheet was placed on top of the layup. Bleeders were arranged and the vacuum bag was sealed and autoclave cured as follows: (1) Vacuum of 5 inches Hg was held in the vacuum bag for 30 minutes, (2) vacuum bag was placed in the autoclave, (3) autoclave was pressurized with nitrogen to 20 psi, (4) vacuum bag vacuum was released, (5) autoclave was pressurized with nitrogen to 45 psi, (6) autoclave was heated to 100° F. in 3 minutes, (7) autoclave was heated to 260° F. at 5° F. per minute and maintained for 90 minutes, (8) autoclave was cooled to 140° F. at 5° F. per minute, (9) autoclave nitrogen pressure was vented, and (10) autoclave was cooled to 100° F. in 5 minutes. The vacuum bag was removed from the autoclave. The cured sample was removed from the vacuum bag and prepared for thermal cycling evaluation.

Thermal cycling evaluations were performed as follows: (1) Samples were cut measuring 4 inches in the warp direction and 2 inches in the fill direction, (2) samples were preconditioned 2 hours at 120° F. and 100% relative humidity prior to thermal cycling, (3) preconditioned samples were cycled (3 cycles per hour) for 400 cycles between −65° F. and 160° F. in a thermal shock chamber, (4) samples were removed from the thermal shock chamber and crack counts measured at room temperature, and (5) steps (2) through, (4), defined as a moisture block, were repeated as desired. Crack counts were measured as follows: (1) two lines, one in the fill direction and one in the warp direction were drawn on each face of the sample using an indelible ink felt tip marking pen such as the "Sharpie" by Sanford, (2) the number of cracks per linear inch was determined by examining the sample under 20× magnification and counting the cracks intersecting a one inch length of each line, (3) the warp and fill crack counts were averaged for each sample face. The following table gives the prepreg properties and the results of the thermal cycling tests.

| | A | B |
|---|---|---|
| Fabric Precoat | 2% by wt. | None |
| Warp Tension (pounds per inch of warp width) | 0.3 | 0.73 |
| Cracks per Linear Inch (tool side) | | |
| 1 moisture block | 1 | 23 |
| 2 moisture blocks | 0 | 33 |
| 3 moisture blocks | 3 | 61 |
| 4 moisture blocks | 2 | — |
| 5 moisture blocks | 6 | — |
| 6 moisture blocks | 6 | — |
| Cracks per Linear Inch (bag side) | | |
| 1 moisture block | 0 | 24 |
| 2 moisture blocks | 1 | 33 |
| 3 moisture blocks | 0 | 66 |
| 4 moisture blocks | 3 | — |
| 5 moisture blocks | 2 | — |
| 6 moisture blocks | 2 | — |

The results given in the table clearly show that composites prepared from Prepreg A demonstrate an order of magnitude improvement in thermal cycling performance as compared with composites prepared from Prepreg B. This improved performance was obtained while still maintaining acceptable mechanical properties. Good results are also obtained when the processing is performed free of warp tension.

We claim:

1. A process for preparing epoxy resin impregnated woven fabrics of poly(paraphenylene terephthalamide) filaments which are resistant to microcracking when employed as facesheets over a honeycomb core of poly(metaphenylene isophthalamide) and subjected to cycling between 160° F. and −65° F. which comprises the steps of:
    (a) precoating a woven fabric of poly(phenylene terephthalamide) filaments with from 0.1 to 10% by wt. based on the weight of the fabric of a mixture of an epoxy resin and a urethane rubber soluble in the epoxy resin, said rubber being present in an amount of from 5 to 40% by wt. of the mixture, and said mixture having a strain to failure of at least 2.5% at −65° F.;
    (b) heating the precoated fabric to an elevated temperature in the range of 250° to 400° F. for a time sufficient to "B" stage the resin;
    (c) impregnating the resulting precoated fabric with from 35 to 70% by wt., based on the weight of the fabric of an epoxy resin having a modulus in excess of 400,000 psi; and
    (d) heating the impregnated product to an elevated temperature in the range of 250° to 400° F. for a time sufficient to "B" stage the resin,
each of steps (a) to (d) above being carried out at a warp tension of less than 0.4 lb/in. of warp width.

2. An epoxy resin impregnated woven fabric of poly(paraphenylene terephthalamide) filaments prepared in accordance with the process of claim 1.

3. The process for preparing a honeycomb cored composite which comprises preparing an impregnated fabric in accordance with claim 1 and placing one or more plies thereof as a facesheet on top of a honeycomb core and curing the resin impregnated fabric while it is pressed against the core.

4. A honeycomb cored composite prepared in accordance with the process of claim 3.

* * * * *